(12) United States Patent
Nimura et al.

(10) Patent No.: US 7,971,674 B2
(45) Date of Patent: Jul. 5, 2011

(54) SHAFT DRIVE TYPE MOTORCYCLE

(75) Inventors: Taisuke Nimura, Tokyo (JP); Hidetoshi Toyoda, Tokyo (JP); Kenji Kofuji, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/565,400

(22) Filed: Sep. 23, 2009

(65) Prior Publication Data
US 2010/0081512 A1    Apr. 1, 2010

(30) Foreign Application Priority Data

Sep. 30, 2008 (JP) ................. 2008-253506

(51) Int. Cl.
*B62D 61/02* (2006.01)
(52) U.S. Cl. .................. 180/226; 180/219; 180/227
(58) Field of Classification Search .......... 180/219, 180/226, 227
See application file for complete search history.

(56) References Cited

U.S. PATENT DOCUMENTS

| | | | | |
|---|---|---|---|---|
| 5,067,580 A | * | 11/1991 | Parker | 180/219 |
| 5,263,549 A | * | 11/1993 | Dick | 180/226 |
| 6,467,565 B1 | * | 10/2002 | Handa et al. | 180/383 |
| 6,932,178 B2 | * | 8/2005 | Soatti | 180/226 |
| 2004/0140141 A1 | * | 7/2004 | Soatti | 180/226 |
| 2004/0188167 A1 | | 9/2004 | Kuroki et al. | |
| 2007/0199756 A1 | | 8/2007 | Kofuji | |
| 2007/0199761 A1 | | 8/2007 | Seki | |
| 2008/0006464 A1 | * | 1/2008 | Utsumi et al. | 180/226 |
| 2009/0183957 A1 | * | 7/2009 | Ishida et al. | 188/181 R |
| 2009/0236168 A1 | * | 9/2009 | Nimura et al. | 180/348 |
| 2010/0078250 A1 | * | 4/2010 | Nimura et al. | 180/226 |

FOREIGN PATENT DOCUMENTS

JP        2007-091123 A    4/2007

\* cited by examiner

*Primary Examiner* — Kevin Hurley
*Assistant Examiner* — Tashiana Adams
(74) *Attorney, Agent, or Firm* — Westerman, Hattori, Daniels & Adrian, LLP

(57) ABSTRACT

A shaft drive type motorcycle includes a drive shaft, a constant-velocity universal joint interposed in the drive shaft, and the pinion gear provided at one end of the drive shaft and meshed with a final gear. A shaft part may be extended from a cup of the constant-velocity universal joint, the shaft part is provided with male splines, and a tubular part extends from the pinion gear. The tubular part is provided with female splines in which to fit the male splines, and the male splines and the female splines are coupled with each other.

3 Claims, 10 Drawing Sheets

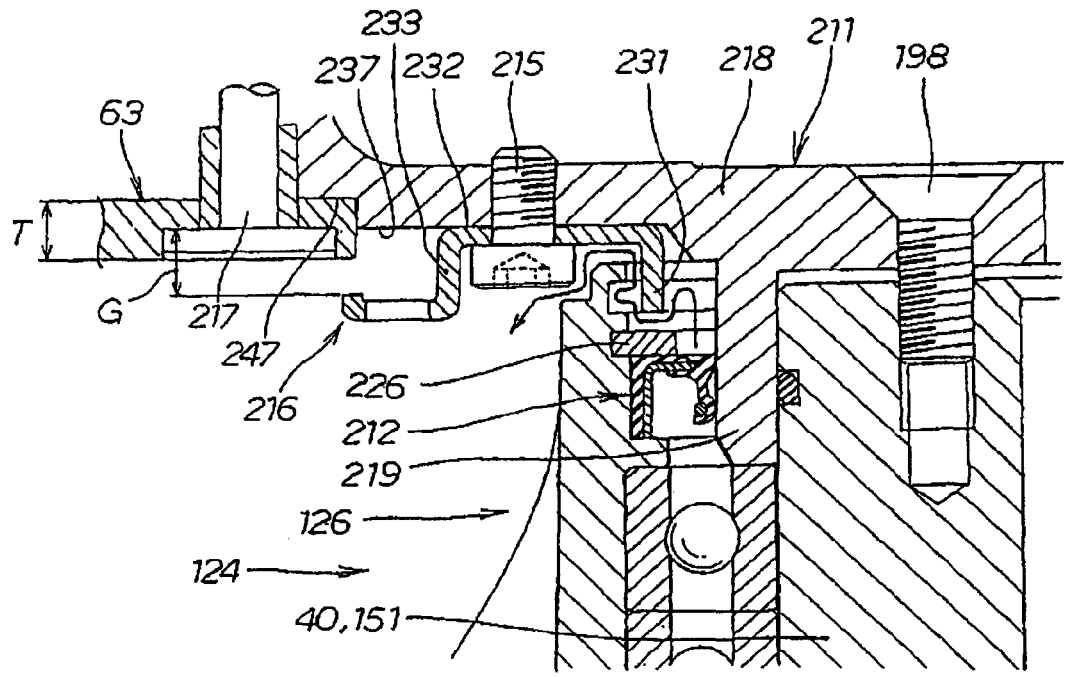
FIG. 9A EXAMPLE
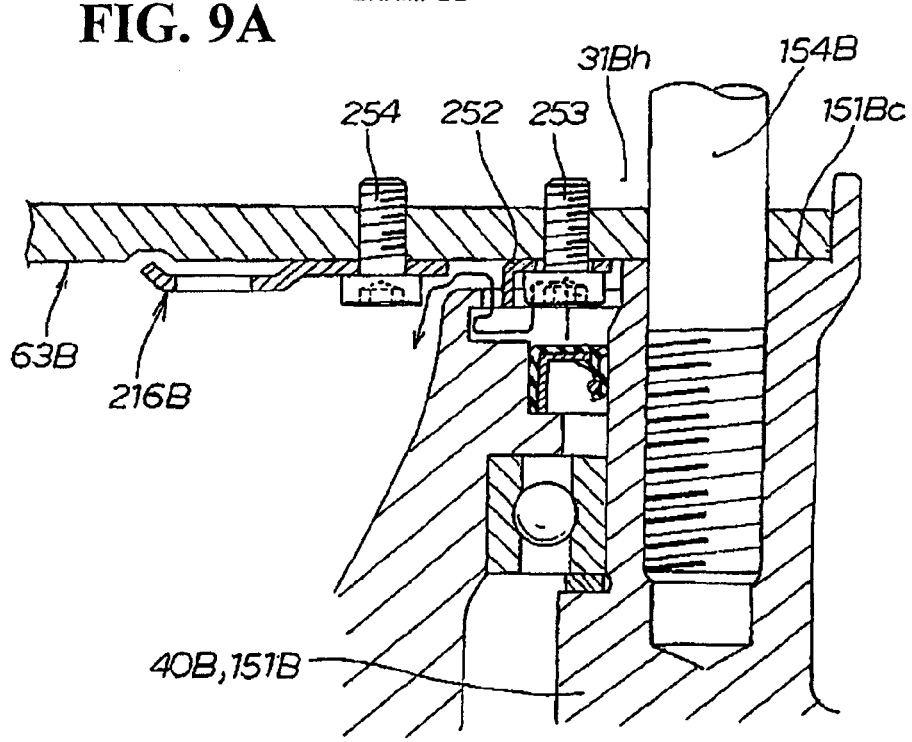
FIG. 9B COMPARATIVE EXAMPLE

SHAFT DRIVE TYPE MOTORCYCLE

TECHNICAL FIELD

The present invention relates to a shaft drive type motorcycle having a drive shaft.

BACKGROUND OF THE INVENTION

There is known a shaft drive type motorcycle in which a drive shaft is provided on the lower side of a pivot shaft, and a driving force of an engine is transmitted to a rear wheel by the drive shaft (see, for example, Patent Document 1, Japanese Patent Laid-open No. 2007-91123 (FIGS. 2 and 6)) incorporated herein by reference.

In FIG. 2 of Patent Document 1, a drive shaft 41 (the reference symbols used in the document are used as they are here) is disposed on the lower side of a pivot shaft 28, a constant-velocity universal joint 82 is connected to the drive shaft 41, and a first final gear 163 (hereinafter referred to as "the pinion gear 163") meshed with a second final gear 164 provided on the side of a rear wheel 39 is attached to the constant-velocity universal joint 82.

A right end (roller) of the drive shaft 41 is inserted in a cup of the constant-velocity universal joint 82 so as to be movable in the left-right direction in the drawing. It is necessary to fill the cup with oil.

Meanwhile, as shown in FIG. 6 of Patent Document 1, the cup of the constant-velocity universal joint 82 is provided with a hole for attaching the pinion gear 163, a shaft of the pinion gear 163 is passed through the hole, and the pinion gear 163 is fastened to the cup through a nut from the inner side of the cup. Such a structure ensures that the constant-velocity universal joint which is large in size and weight can be disposed as close as possible to a bearing for the pinion gear, so that vibrations due to high-speed rotation of the constant-velocity universal joint can be prevented as securely as possible.

Here, referring to the relationship between the cup and the pinion gear 163, the shaft of the pinion gear 163 is inserted in the through-hole formed in the cup, and the operation of filling the cup with oil must be carried out after the pinion gear and the cup are coupled to each other.

In the above-mentioned structure, in view of the operation of filling the cup with the oil, it is impossible to perform sub-assembly of the constant-velocity universal joint 84 before assembly of the drive shaft 41. Therefore, there is a limitation as to the degree of freedom in assembling the drive shaft, and there is room for improvements from the viewpoint of assuring an assembly work at enhanced speed and efficiency.

SUMMARY OF THE INVENTION

In a shaft drive type motorcycle, it is possible to enhance the degree of freedom and efficiency of a drive shaft assembly work while suppressing generation of vibrations, by disposing a constant-velocity universal joint, which is large in size and weight, close to a bearing part for supporting a pinion gear.

For example, a shaft drive type motorcycle may include a body frame, a swing arm provided on the body frame and operative to swingably support a rear wheel, a drive shaft provided in the swing arm or adjacently to the swing arm and operative to transmit a driving force of an engine to the rear wheel, a constant-velocity universal joint interposed in the drive shaft, and a pinion gear provided at one end of the drive shaft and meshed with a final gear provided at the rear wheel, wherein a shaft part is extended from a cup of the constant-velocity universal joint, the shaft part is provided with a male spline, a tubular part is extended from the pinion gear, the tubular part being provided with a female spline in which to fit the male spline, and the male spline and a female spline constitute a spline coupling part.

The spline coupling part is disposed on the inner side of a bearing part for supporting the tubular part of the pinion gear.

The pinion gear includes a tooth part, and a tubular part extending forward from the tooth part, the tubular part is provided with a through-hole, a front half of the through-hole is provided with the female spline, and a pinion shaft is inserted in a rear half of the through-hole.

The shaft part extended from the cup of the constant-velocity universal joint is provided with the male spline, and the tubular part extended from the pinion gear is provided with the female spline in which to fit the male spline.

Conventionally, in the constant-velocity universal joint having a structure in which a cup is provided with a through-hole and a shaft of a pinion gear is inserted in the through-hole, sub-assembly of the constant-velocity universal joint 84 cannot be conducted before assembly of a drive shaft 41. Therefore, there has been a limitation as to the degree of freedom in assembling the drive shaft, and there has been room for improvements from the viewpoint of enhancing the speed and efficiency of the assembly work.

Since the instant shaft part is extended from the cup of the constant-velocity universal joint and the tubular part of the pinion gear is fitted over the shaft part, the cut of the constant-velocity universal joint can be attached to the pinion gear after sub-assembly of the constant-velocity universal joint. Therefore, the degree of freedom in the working procedure can be enhanced and, simultaneously, enhancement of the speed and efficiency of the work can be achieved.

In addition, the constant-velocity universal joint, which is large in size and weight, is disposed close to the bearing part of the pinion gear and therefore, generation of vibrations can be suppressed.

The spline coupling part is disposed on the inner side of the bearing part for supporting the shaft of the pinion gear and, therefore, the constant-velocity universal joint can be disposed closer to the bearing part. Since the constant-velocity universal joint is disposed close to the bearing part, generation of vibrations of the constant-velocity universal joint can be further suppressed.

The pinion gear is provided with the tubular part extending forward the tubular part is provided with the through-hole, the front half of the through-hole is provided with the female spline, and the pinion gear is inserted in the rear half of the through-hole. Therefore, the pinion gear can be easily equipped with the female spline and the pinion shaft.

BRIEF DESCRIPTION OF THE DRAWINGS

The above and other features and advantages of embodiments of the present invention will become more apparent by describing in detail exemplary embodiments thereof with reference to the attached drawings in which:

FIGS. 9A and 9B illustrate a mounting structure for a pulser ring according to an embodiment of the present invention and a Comparative Example.

DETAILED DESCRIPTION OF THE INVENTION

Figure 1:
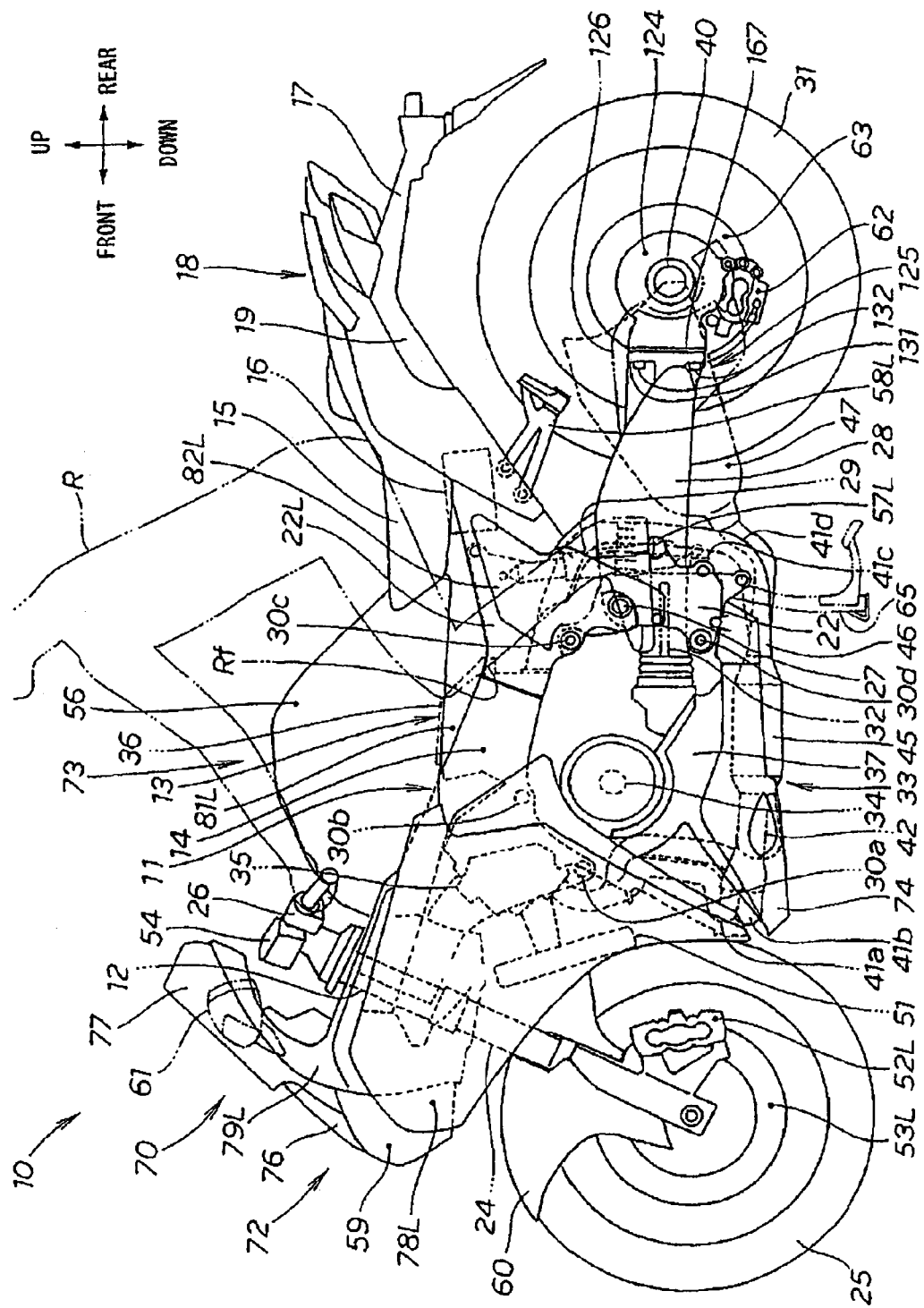
FIG. 1 is a left side view of a vehicle according to an embodiment of the present invention.

In the drawings, the expressions "up (upper)," "down (lower)," "left (leftward)," "right (rightward)," "front (forward)," and "rear (rearward)" refer to the directions as viewed from a rider seated on the vehicle. Incidentally, the drawings are to be viewed according to the posture of reference symbols.

FIG. 1 is a left side view of a vehicle according to the present embodiment, and a motorcycle 10 as the vehicle has a body frame 11.

The body frame 11 includes a head pipe 12, a main frame 14 extended rearwards from the head pipe 12 so as to support an engine 13, and a rear frame 19 which is extended rearwards from an upper part of the rear end of the main frame 14, supports a rider's seat 15, is fitted with electric equipment such as a battery 16, and supports a body rear part 18 inclusive of a rear fender 17.

Incidentally, the main frame 14 includes pivot plates 22 for supporting a swing arm 28 provided at a rear end part of the main frame 14.

The pivot plates 22 are fitted with a pivot shaft 27, the rear swing arm 28 (swing arm 28) is extended rearwards from the pivot shaft 27, a rear cushion unit 29 for absorbing shocks is provided between the swing arm 28 and the main frame 14, and a rear wheel 31 is mounted to a tip part of the swing arm 28. The rear wheel 31 is driven by a drive shaft 32 which connects the engine 13 and the rear wheel 31 to each other and transmits a driving force of the engine 13 to the rear wheel 31.

The head pipe 12 is fitted with a front fork 24, a front wheel 25 is mounted to lower end parts of the front fork 24, and a steering handle 26 for steering the front wheel 25 is provided at an upper end part of the front fork 24.

The engine 13 (V-type 4-cylinder engine 13) is mounted on the main frame 14. The engine 13 is supported on the main frame 14 through first to fourth support points 30a to 30d. The first to fourth support points 30a to 30d are provided horizontally along the vehicle width direction, and are arranged in this order from the front side toward the rear side of the vehicle. Of these support points, the third and fourth support points 30c and 30d are provided at the pivot plates 22. Specifically, the engine 13 is suspended by the main frame 14 and the pivot plates 22.

The V-type 4-cylinder engine 13 has a form in which a crank case 37, front cylinders 35 extended skewly toward the front upper side with a crankshaft 34 provided in the crankcase 37 as a center, and rear cylinders 36 extended skewly toward the rear upper side with the crankshaft 34 as a center are arranged in a V-shaped overall form. The V-type 4-cylinder engine 13 is so suspended that, when the vehicle is viewed sideways, the main frame 14 overlaps with the front cylinders 35 and the rear cylinders 36 constituting upper parts of the engine 13, and some parts of the pivot plates 22 overlap with the crankcase 37 constituting a rear part of the engine 13.

The V-type 4-cylinder engine 13 is provided with an exhaust system 33.

The exhaust system 33 includes exhaust pipes 41a to 41d extended respectively from the cylinders 35, 35, 36, 36, a catalyst pipe 45 into which the exhaust pipes 41a to 41d are collected and which clarifies an exhaust gas, a general collecting pipe 46 extended from the catalyst pipe 45, and a muffler 47 connected to the general collecting pipe 46.

In the figure, symbol 51 denotes a radiator unit for cooling the engine 13; symbols 52L and 52R (only symbol 52L on the viewer's side is shown, and the same applies hereinafter) denote front disc brake calipers provided on the front fork; symbols 53L and 53R (only symbol 53L on the viewer's side is shown, and the same applies hereinafter) denote front brake discs which are provided at the front wheel 25 and are sandwiched between the front disc brake calipers 52L and 52R; symbol 54 denotes a front master cylinder provided at the steering handle; symbol 56 denotes a fuel tank cover which covers a fuel tank attached to the main frame 14 and which functions also as a cowl part 70 (described later); symbols 57L and 57R (only symbol 57L on the viewer's side is shown, and the same applies hereinafter) denote rider's steps attached to the main frame 14; symbol 58L and 58R (only symbol 58L on the viewer's side is shown, and the same applies hereinafter) denote pillion passenger's steps attached to the rear frame 19; symbol 59 denotes a headlight; symbol 60 denotes a front fender; symbols 61L and 61R (only symbol 61L on the viewer's side is shown, and the same applied hereinafter) denote mirrors; symbol 62 denotes a rear disc brake caliper; symbol 63 denotes a rear brake disc which is provided on the rear wheel 31 and is sandwiched by the rear disc brake caliper 62; and symbol 65 denotes a main stand.

Now, the cowl part 70 constituting mainly an appearance part of the motorcycle 10 will be described below.

The cowl part 70 includes a front cowl part 72 which is extended from the head pipe 12 and which covers the front side of the body frame 11 through a cowl stay 71 (described later), a side cowl part 73 which is provided to be continuous with the front cowl part 72 and which covers the lateral sides of the vehicle, and an under cowl 74 provided on the lower side of the engine 13. The cowl part 70 is provided for such purposes as serving as a windshield and enhancing appearance of the vehicle.

The front cowl part 72 includes an upper center cowl 76 covering the upper side of the headlight 59, a windscreen 77 extending on the upper side of the upper center cowl 76, and some parts of front upper side cowls 79L and 79R (only symbol 79L on the viewer's side is shown, and the same applies hereinafter) to which middle cowls 78L and 78R (only symbol 78L on the viewer's side is shown, and the same applies hereinafter) covering the lateral sides of the main frame 14 are attached and which support left and right portions of the windscreen 77.

The side cowl part 73 includes: the front upper side cowls 79L and 79R supporting the left and right parts of the windscreen 77; the middle cowls 78L and 78R covering the lateral sides of the head pipe 12 and the main frame 14; knee covers 81L and 81R (only symbol 81L on the viewer's side is shown, and the same applies hereinafter) which cover the lower side of the fuel tank cover 56 and are clamped between leg parts Rf of the rider R during riding; and pivot plate covers 82L and 82R which are provided on the lower side of the knee covers 81L, 81R and which cover the outside surfaces of the pivot plates 22L, 22R (only symbol 22L on the viewer's side is shown, and the same applies hereinafter) serving as components of the main frame 14.

Supplementing the rear part structure of the vehicle, at a rear part of the swing arm 28, a gear box 124 having a rear wheel axle 40 therein is provided, a fastening part 125 for fastening the gear box 124 to the swing arm 28 is provided, and the fastening part 125 is provided with a gear box cover 126 covering the outside surfaces of the gear box 124 from the lateral sides.

The fastening part 125 is provided with a flange part 131 provided on the swing arm 28 side, and fastening members 132 ... which are attached to the flange part 131, are screwed into the gear box 124 from the swing arm 28 and fix the swing arm 28 and the gear box 124 relative to each other.

Figure 2:
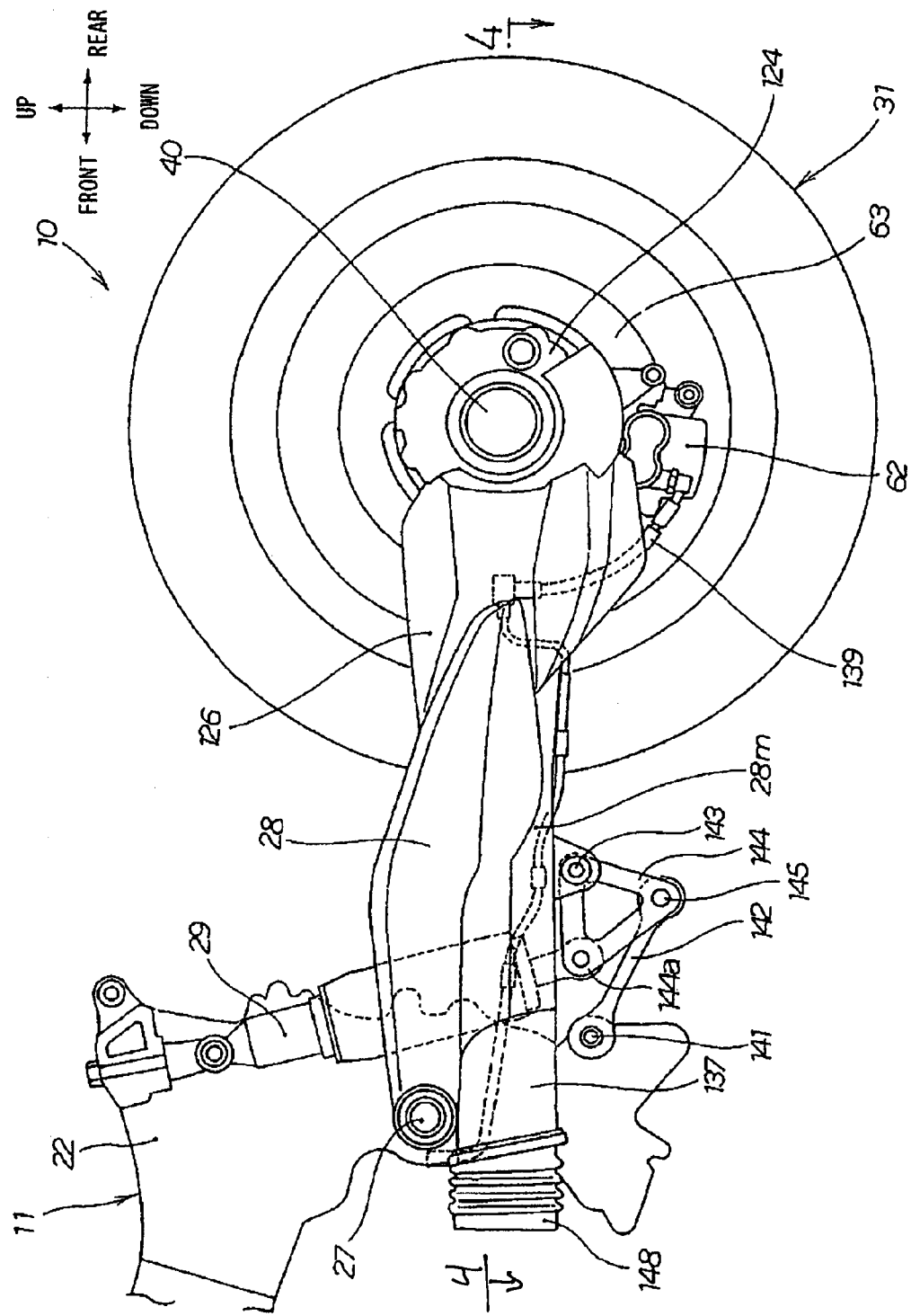
FIG. 2 is a side view of a major part of a motorcycle according to an embodiment of the present invention.
Figure 3:
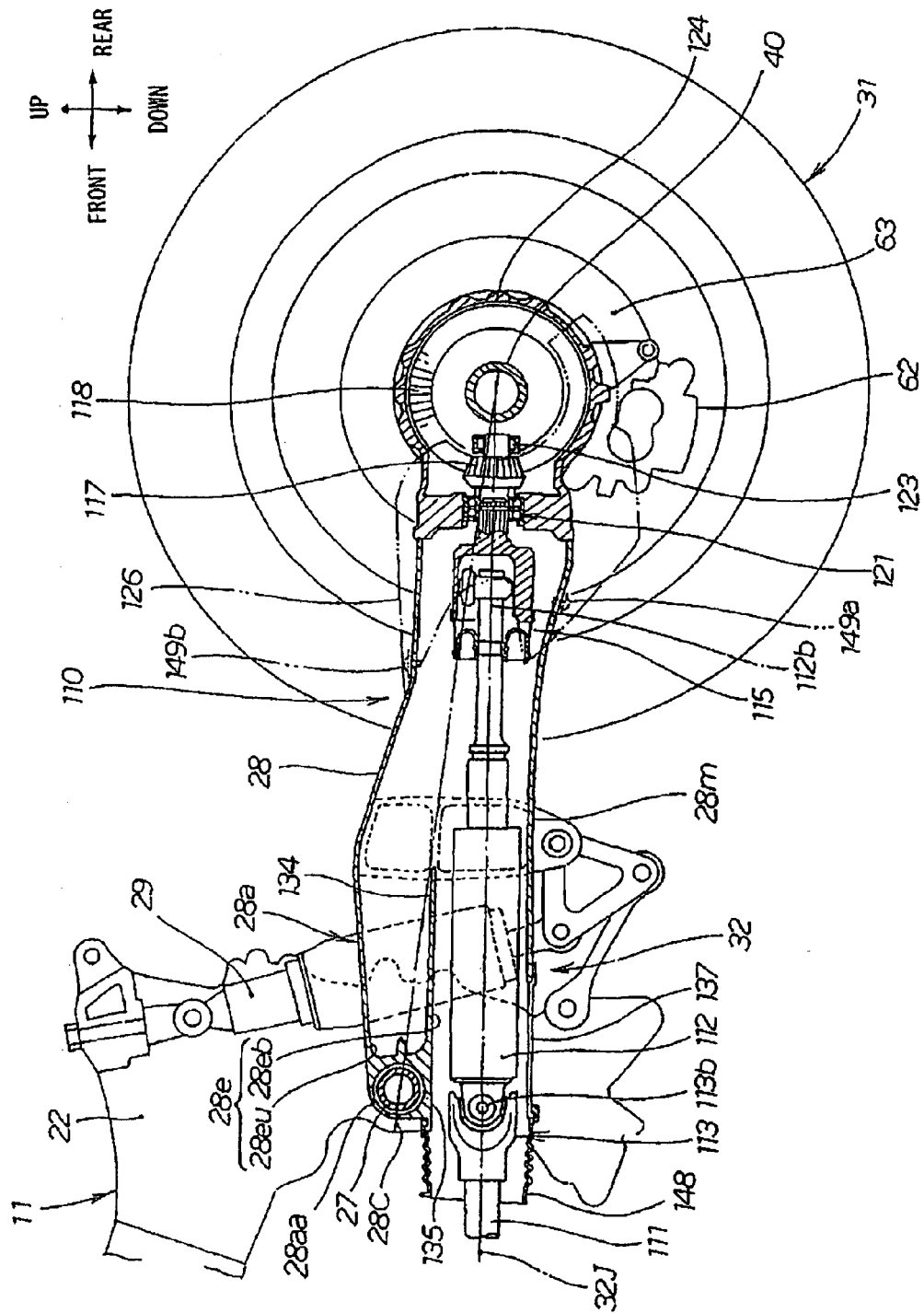
FIG. 3 is a sectional view of a major part of the motorcycle according to the embodiment of the present invention.

FIG. 2 is a side view of a major part of the motorcycle according to an embodiment of the present invention, and FIG. 3 is a sectional view of a major part of the motorcycle according to an embodiment of the present invention. Now, description will be made referring to FIGS. 2 and 3.

The motorcycle 10 according to the present embodiment can also be said to be a shaft drive type motorcycle 10, since the drive shaft 32 is used as means for transmitting the driving force of the engine (symbol 13 in FIG. 1) to the rear wheel 31.

The shaft drive type motorcycle 10 includes a pivot shaft 27 provided on the pivot plates 22, the swing arm 28 swingably provided on the pivot shaft 27, the rear wheel 31 rotatably born on a rear part of the swing arm 28 through the rear wheel axle 40, and the rear cushion 29 (rear cushion unit 29) interposed between the swing arm 28 and the body frame 11. The drive shaft 32 for transmitting the driving force of the engine 13 to the rear wheel 31 is provided inside the swing arm 28.

Incidentally, while the drive shaft is provided inside the swing arm in this embodiment, the drive shaft may be provided adjacently to the swing arm.

The drive shaft 32 includes a universal joint 113 connected to an output shaft 111 of the engine (symbol 13 in FIG. 1) and operative to transmit the driving force, a drive shaft 112 connected to the rear end 113b of the universal joint 113 and operative to transmit the driving force of the engine 13, a constant-velocity universal joint 115 attached to the rear end 112b of the drive shaft 112 and enables the axial length of the drive shaft 112 to be varied, and a pinion gear 117 connected to the constant-velocity universal joint 115.

By the pinion gear 117 and a final gear 118 meshed with the pinion gear 117, the driving force of the engine 13 is transmitted to the rear wheel axle 40. In the figure, symbols 121 and 123 denote bearing parts for supporting the pinion gear 117. The structure for mounting the pinion gear 117 will be described in detail later.

Now, the configuration of the swing arm, the positional relationship between the swing arm and the drive shaft, etc. will be described below.

When the vehicle body is viewed sideways, the center axis 32J of the drive shaft is disposed on the lower side of a straight line 28C connecting the pivot shaft 27 and an axle shaft 40 (rear wheel axle 40) of the rear wheel 31 to each other. The straight line 28C connecting the pivot shaft 27 and the axle axis 40 of the rear wheel 31 to each other penetrates the swing arm 28 in the front-rear direction, and the swing arm 28 is so provided as to surround the drive shaft 32.

The swing arm 28 has a hollow part 28e, is provided in its front part 28a with an upper space 28eu and a lower space 28eb partitioned from each other by a partition member 134, and the drive shaft 32 is provided in the lower space 28eb.

Since the swing arm 28 is provided with the partition member 134 in its front part 28a, the rigidity in the vicinity of the pivot shaft 27 can be enhanced. In addition, the center of return of the swing arm 28 can be set close to the pivot shaft 27 in the height direction. If the center of return of the swing arm 28 can be set close to the pivot shaft 27, the behavior characteristics of the rear wheel 31 during cornering can be set close to those of a general motorcycle, so that appropriate steerability can be maintained during cornering.

The swing arm 28 is provided with a cutout part 133 at a lower part of the front end 28aa thereof. The cutout part 133 is covered with a cover member 137, and the cover member 137 covers a front part of the drive shaft 32. The cover member 137 is formed from a resin, which promises a reduction in weight.

The gear box 124 for containing the rear wheel axle 40 and drive system component parts in the surroundings of the rear wheel axle 40 is disposed at a rear end part of the swing arm 28.

The swing arm 28 is provided with a first arm member 142 which is extended rearwards from the body frame 11 through a first swinging shaft 141 and is provided so as to be swingable, a second arm member 144 having a substantially triangular shape in side view which is extended forward from an intermediate part 28m of the swing arm 28 through a second swinging shaft 143 and is provided so as to be swingable, the rear cushion unit 29 (rear cushion 29) which is interposed between the front end 144a of the second arm member 144 and the body frame 11, and a third swinging shaft 145 by which a tip part of the first arm member 142 is swingably mounted to an intermediate part 144 of the second arm member 144. This ensures that vibrations exerted on the swing arm 28 and the like are absorbed. Symbol 148 denotes a boot, and symbols 149a and 149b denote bolts for attaching the gear box cover 126 to the swing arm 28.

The swing arm 28 has a lower part of its front end 28aa cut out so that rigidity of the swing arm 28 on the lower side of the pivot shaft 27 is lowered. With the rigidity of the swing arm 28 on the lower side of the pivot shaft 27 thus lowered, the center of return of the swing arm 28 can be set closer to the pivot shaft 27 in the height direction, whereby appropriate return characteristics can be set.

A brake hose 139 connected to the rear brake caliper 62 is covered by the gear box cover 126. Since the brake hose 139 is covered by the gear box cover 126 so that the brake hose 139 is invisible, appearance around the rear brake caliper 62 can be further enhanced.

Figure 4:
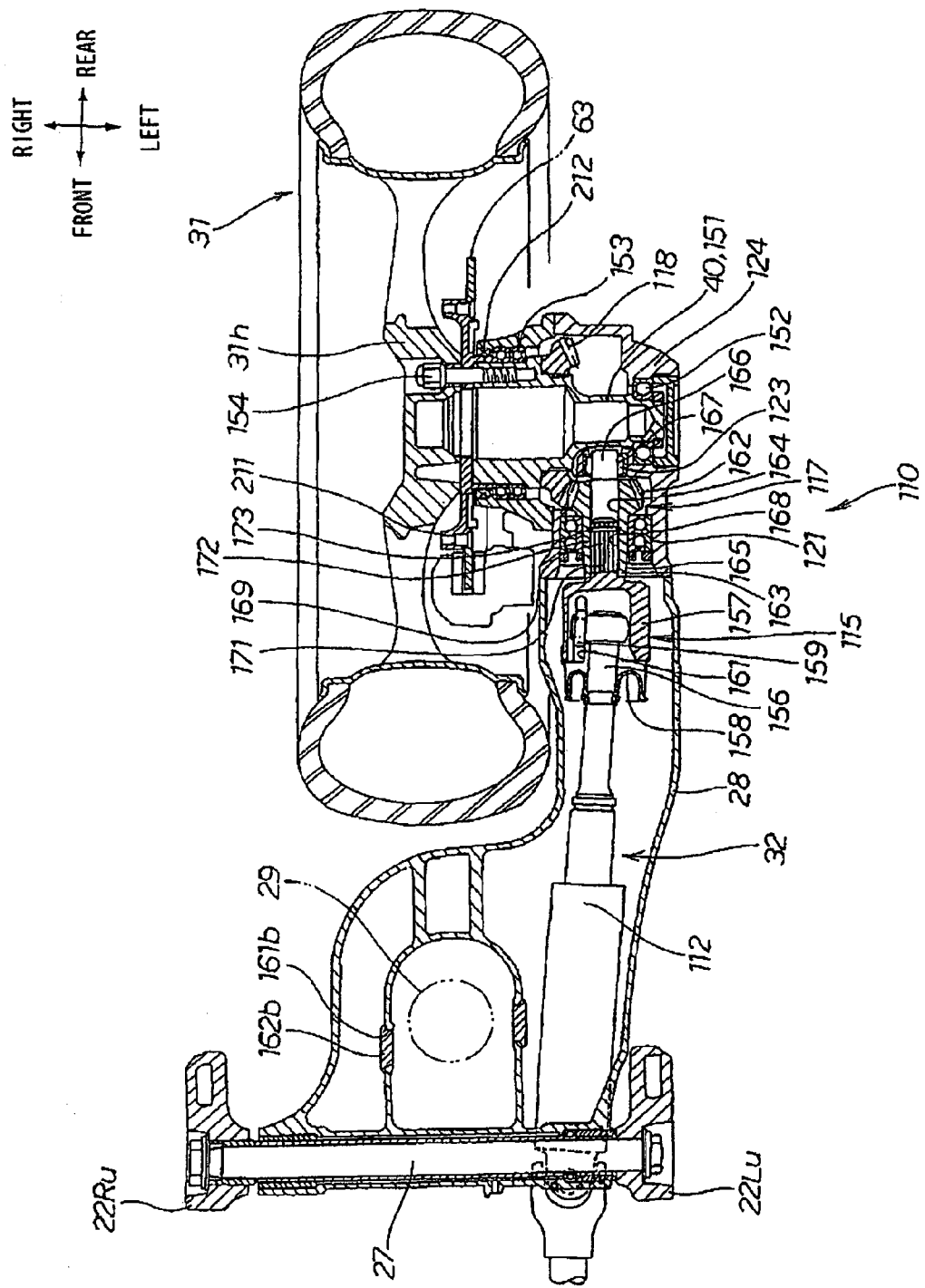
FIG. 4 is a sectional view taken along line 4-4 of FIG. 2.

FIG. 4 is a sectional view taken along line 4-4 of FIG. 2, showing that a rear wheel driving mechanism 110 includes, as main component elements thereof: the drive shaft 32; the bearing parts 121 and 123 for rotatably supporting the pinion gear 117 constituting a rear part of the drive shaft 32; the final gear 118 which is meshed with the pinion gear 117 serving as a component element of the drive shaft 32 and which changes the direction of the driving force of the engine 13 by 90°; a sleeve 151 as the rear wheel axle 40 to which the final gear 118 is integrally attached; a left bearing 152 and a right bearing 153 for rotatably supporting the sleeve 151; and the gear box 124 supporting both the left bearing 152 and the right bearing 153.

In other words, the rear wheel driving mechanism 110 is contained in the swing arm 28 and the gear box 124 provided at the tip of the swing arm 28. The left and right bearings 152 and 153 are members which are provided between the gear box 124 and the rear wheel axle 40 and which rotatably support the rear wheel axle 40.

The swing arm 28 is a member extending on the left side of the rear wheel 31, and the rear wheel 31 is supported in a cantilever fashion.

While the swing arm 28 and the drive shaft 32 are disposed on the left side of the rear wheel 31 in this embodiment, they may be disposed on the right side of the rear wheel 31.

To the sleeve 151 serving as the rear wheel axle 40 which is rotatably provided in the gear box 124, a rear brake disc 63 and a rear wheel hub 31h included in the rear wheel 31 are integrally fastened through fastening bolts 154.

The configuration as above ensures that the driving force exerted on the final gear 118 serving as a driven gear is transmitted through the sleeve 151 and the rear wheel hub 31h to drive the rear wheel 31.

Now, details of the constant-velocity universal joint 115 and the pinion gear 117 connected to the constant-velocity universal joint 115 will be described below.

Figure 5:
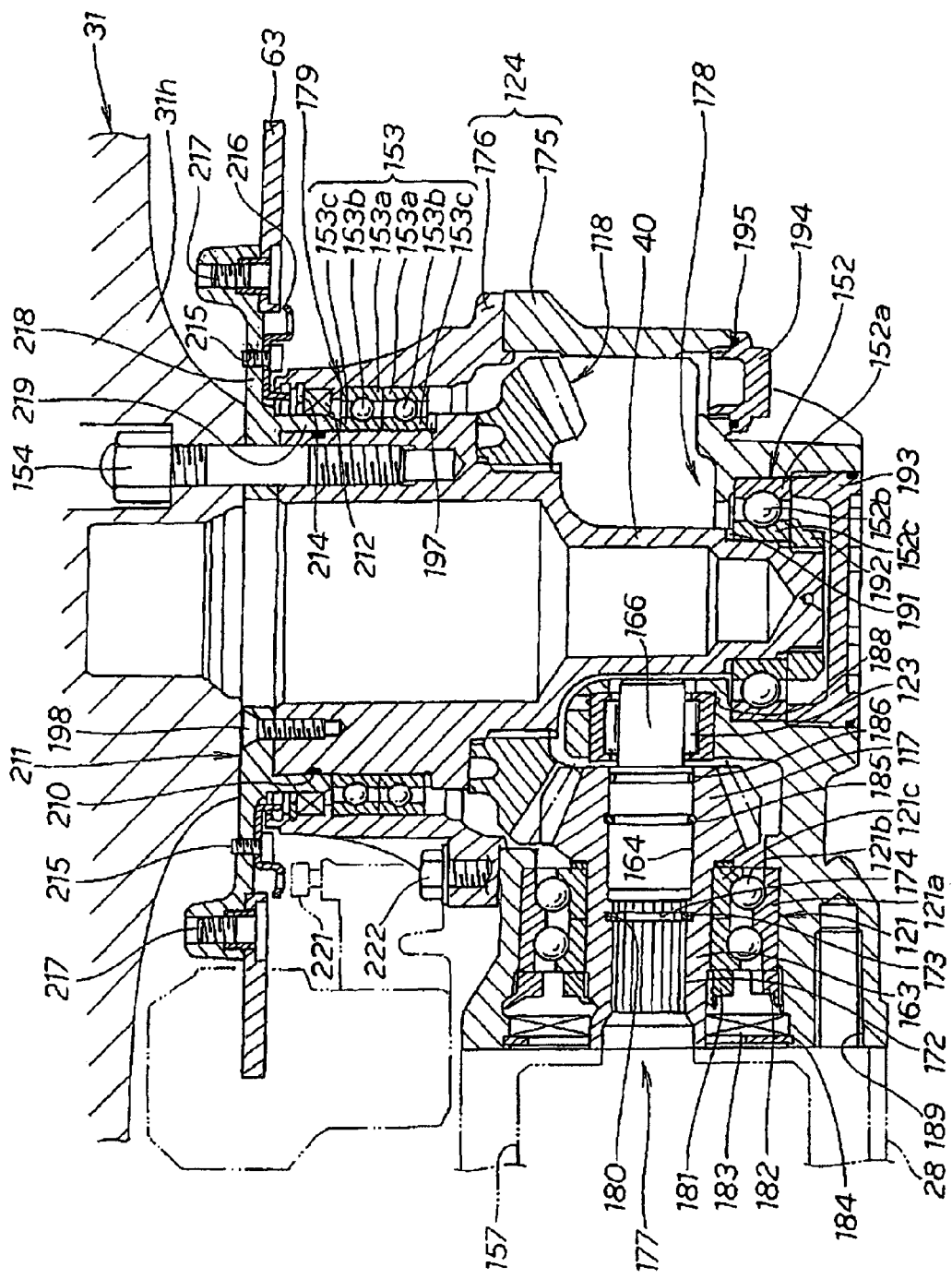
FIG. 5 is a sectional view for illustrating the internal structure of a gear box according to an embodiment of the present invention.

FIG. 5 is a sectional view for illustrating the internal structure of the gear box according to the present embodiment, and description will be made referring to this figure together with FIG. 4.

The constant-velocity universal joint 115 has an input shaft 156 as a tripod part which has three sub-shafts on the same plane and to which the driving force of the engine 13 is inputted, a cup 157 which is connected to the input shaft 156 so as to be inclinable and slidable and from which the driving force of the engine (symbol 13 in FIG. 1) is outputted, and a boot 158 covering a front part of the cup 157. Symbol 159 denotes a roller part fitted to the sub-shafts, and symbol 161 denotes a groove in which the roller part is fitted.

The front part of the cup 157 is covered by the boot 158, and the inside of the cup 157 is filled with oil.

The pinion gear 117 includes a tooth part 162, and a tubular part 163 extending forward from the tooth part 162. The tubular part 163 is provided with an inner peripheral part 164 as a through-hole, the inner peripheral part 164 is provided with female splines 168 at least at a front half thereof, and a pinion shaft 166 for supporting the rear end of the drive shaft 32 is inserted in a rear half of the inner peripheral part 164.

In this embodiment, the inner peripheral part 164 is provided with the female splines 168 over the entire surface of the inner peripheral part 164, for convenience of machining, the pinion shaft 166 is inserted in the rear half of the inner peripheral surface 164 shaped in such a form, and the pinion shaft 166 is axially non-movably attached to the pinion gear 117 through a circlip 185.

Such a configuration ensures that the pinion gear 117 can be easily provided with the female splines 168 and the pinion shaft 166, whereby a rise in the cost of the pinion gear 117 is suppressed.

Incidentally, an outer peripheral part 165 of the tubular part 163 is supported by the bearing part 121, and an outer peripheral part 167 of the pinion shaft 166 is supported by the bearing part 123.

Male splines 169 provided on the constant-velocity universal joint 115 are provided with a first groove 174 in the circumferential direction, a circlip 173 is fitted in the first groove 174, and a tubular part of the pinion gear 117 is provided at its inner periphery with a second groove 180 for engagement with the circlip 173.

With the circlip 173 interposed in a spline coupling part 172, a shaft part 171 can be securely attached to the tubular part 163 at the spline coupling part 172, and, in addition, generation of axial vibrations or the like can be prevented from occurring.

The shaft part 171 is extended rearwards from the cup 157 of the constant-velocity universal joint, the shaft part 171 is provided with the male splines 169, the tubular part 163 extended forward from the pinion gear 117 is provided with the female splines 168 in which to fit the male splines 169, and the male splines 169 and the female splines 168 are coupled with each other. In short, the male splines 169 and the female splines 168 constitute the spline coupling part 172.

The spline coupling part 172 is disposed on the inside of the bearing part 121 for supporting the tubular part 163 serving as a pinion gear shaft as a shaft provided as part of the pinion gear 117. In other words, the spline coupling part 172 is disposed so that a part thereof overlaps with the bearing part 121, and, therefore, the constant-velocity universal joint 115 can be disposed close to the bearing part 121. Since the constant-velocity universal joint 115 is disposed close to the bearing part 121, generation of vibrations in the constant-velocity universal joint 115 can be further suppressed.

Incidentally, while the spline coupling part is disposed on the inside of the bearing part in this embodiment, the spline coupling part may be disposed on the outside of the bearing part.

The gear box 124 includes a gear case 175 which is provided with a left bearing 152 supporting the left end of the rear wheel axle 40 and the bearing parts 121 and 123 supporting the pinion gear 117 and which covers the left side of the vehicle, and a gear case cover 176 which is disposed opposite to the gear case 175 and which is provided with a right bearing 153 supporting the right end of the rear wheel axle 40.

The gear box 124 as above is provided with a gear box front part 177 in which to contain the pinion gear 117, a gear box left part 178 in which to contain the left bearing 152 supporting the left side of the rear wheel axle 40, and a gear box right part 179 in which to contain the right bearing 153 supporting the right side of the rear wheel axle 40.

The gear box front part 177 includes: the pinion gear 117; the bearing part 121 rotatably supporting the outer periphery of the tubular part 163 provided as part of the pinion gear 117; a first lock nut 181 for locking the inner race 121c of the bearing part 121 together with the tubular part 163; a second lock nut 182 for locking the outer race 121a of the bearing part 121 to the gear case 175 serving as a component member of the gear box 124; a first oil seal 183 provided on the front side of the first and second lock nuts 181 and 182; a first retainer clip 184 provided on the front side of the first oil seal 183; a pinion shaft 166 inserted in the tubular part 163 of the pinion gear 117 and operative to support a rear part of the pinion gear 117; a circlip 185 and an O-ring 186 interposed between the pinion shaft 166 and the tubular part 163; the bearing part 123 as a needle bearing for rotatably supporting a rear end part of the pinion shaft 166; and a stopper ring 188 provided on the outside of the bearing part 123.

Symbol 189 denotes a fastening hole into which the fastening member 132 is screwed.

The gear box left part 178 includes: the left bearing 152 for rotatably supporting the left end of the rear wheel axle 40; a second shim ring 191 interposed between an inner race 152c of the left bearing 152 and the rear wheel axle 40; a third lock nut 192 for locking the inner race 152c of the left bearing 152 to the rear wheel axle 40; a fourth lock nut 193 as a retainer for locking an outer race 152a of the left bearing 152 to the gear box 124; a cap 194 closing a hole provided for measurement of backlash of the final gear 118; and a cap O-ring 195 as a seal member interposed between the cap 194 and the gear box 124.

The left bearing 152 includes the outer race 152a, balls 152b, and the inner race 152c.

The gear box right part 179 includes: the right bearing 153 for rotatably supporting the rear wheel axle 40 integrated with the final gear 118; a third shim ring 197 for position adjustment which is interposed between an inner race 153c of the right bearing 153 and the rear wheel axle 40; a presser flange 211 for pressing the inner race 153c of the right bearing 153 from the outer side toward the inner side of the vehicle in the axial direction of the rear wheel axle 40 through screw members 198; an axle oil seal 212 interposed between the presser flange 211 and the gear box 124; a retainer ring 214 for preventing the axle oil seal 212 from slipping off; a pulser ring 216 which is provided at the presser flange 211 through bolts 215 and which serves for measurement of the wheel speed of the rear wheel 31; and the rear brake disc 63 provided at the presser flange 211 through flat bolts 217.

The presser flange 211 is so mounted that a hollow cylindrical part 219 is disposed between the axle oil seal 212 and the retainer ring 214, and the rear wheel axle 40.

The right bearing 153 has a structure in which radial-type bearings each includes the outer race 153a, balls 153b and an inner race 153c, are arranged in two rows.

The presser flange 211 includes: a flange part 218 which is provided in the radial direction of the rear wheel axle 40 and to which the rear brake disc 63 as a brake disc is attached; and the hollow cylindrical part 219 which is disposed between the rear wheel axle 40 and the rear wheel hub 31h and which presses the inner race 153c in the axial direction of the rear wheel axle 40.

In the figure, symbol 221 denotes a sensor which is provided on the swing arm 28 side and which is combined with the pulser ring 216 so as to detect a wheel speed signal, and symbol 222 denotes a bolt for attaching the gear case cover 176 to the gear case 175.

Figure 6:
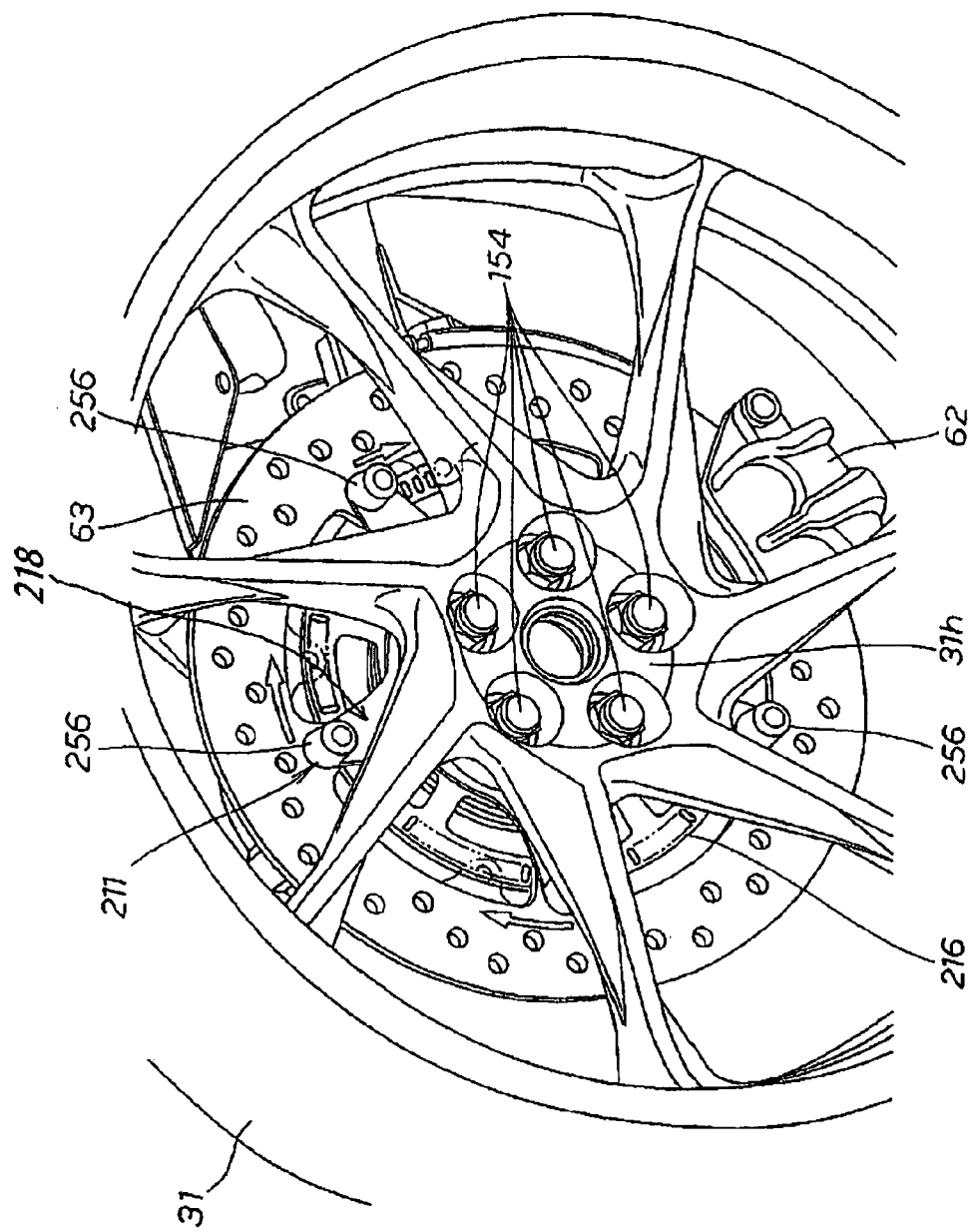
FIG. 6 is a perspective view showing a presser flange attached to a rear wheel according to the present invention and the surroundings of the same.

FIG. 6 is a perspective view for illustrating the presser flange attached to the rear wheel according to an embodiment of the present invention and the surroundings of the presser flange.

The rear wheel hub 31h is attached to the rear wheel axle (symbol 40 in FIG. 5) through the fastening bolts 154, the presser flange 211 rotated as one body with the rear wheel hub 31h is provided with a flange part 218, the flange part 218 includes five arm parts 256 extended in the radial direction of the rear wheel axle 40, and the rear brake disc 63 is attached to tip parts of the arm parts 256.

Returning to FIG. 5, the presser flange 211 is provided between the rear wheel axle 40 and the rear wheel 31, and the rear brake disc 63 is attached to the presser flange 211, so that the rear brake disc 63 can be disposed in a limited space. In addition, the pulser ring 216 is mounted on the inner side of the rear brake disc 63. Specifically, the pulser ring 216 is mounted on the inner side in the radial direction relative to disc mounting parts 247 provided as part of the flange part 218. The presser flange 211 eliminates the need for an inner-side portion of the rear brake disc 63, so that the pulser ring 216 can be mounted by utilizing the inner-side area of the rear brake disc 63, and the structure around the rear brake disc can be configured to be compact and thin.

Figure 7:
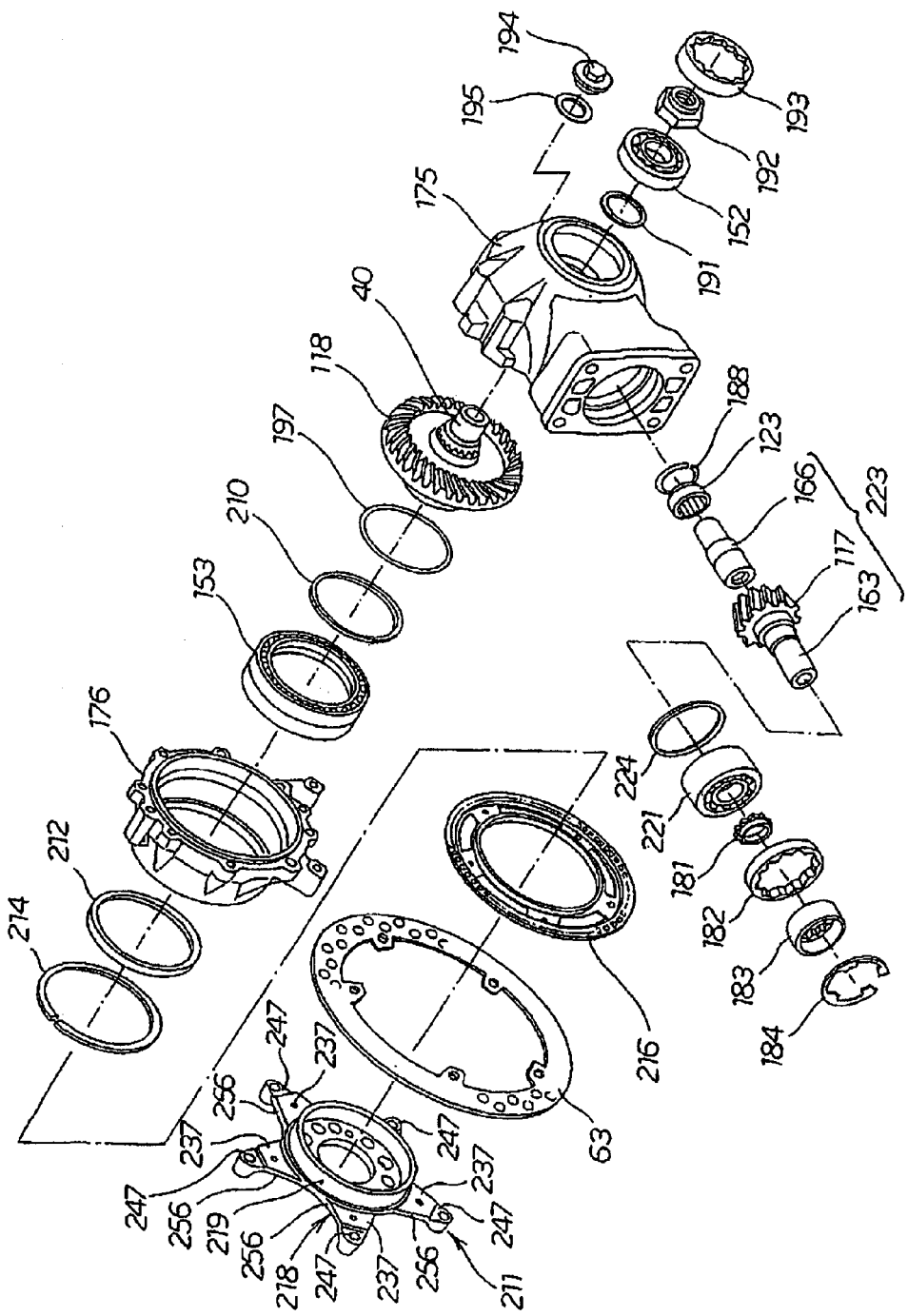
FIG. 7 is an exploded perspective view for illustrating a rear wheel axle according to an embodiment of the present invention and the surroundings of the same.

FIG. 7 is an exploded perspective view for illustrating the rear wheel according to an embodiment of the present invention and the surroundings of the same.

First, component members in the surroundings of the rear wheel will be described.

The rear wheel axle 40 with the final gear 118 fitted thereon is inserted into the gear case 175 from the right side, the second shim ring 191 is inserted from the left side of the gear case 175, the left bearing 152 is inserted, and the left bearing 152 is locked by a third lock nut 192 and a fourth lock nut 193.

The third shim ring 197 and the right bearing 153 are fitted onto the rear wheel axle 40 from the right side of the gear case 175, the gear case cover 176 is attached to the right bearing 153, the axle oil seal 212 and the retainer ring 214 are fitted in position from the outside of the gear case cover 176, and the presser flange 211 is attached. Incidentally, the rear brake disc 63 and the pulser ring 216 are preliminarily attached to the presser flange 211.

The surroundings of the presser flange 211 will be described referring also to FIG. 5.

The presser flange 211 has the five arm parts 256 extending radially outwards from a hollow cylindrical part 219, the rear brake disc 63 is attached to the disc mounting parts 247 provided at the tip parts of the five arm parts 256, the pulser ring 216 is attached to these arm parts 256 and to ring mounting parts 237 provided on the inner side of the disc mounting parts 247, and the hollow cylindrical part 219 of the presser flange 211 is fitted onto and mounted to the rear wheel axle 40.

Symbol 210 denotes a seal interposed between the rear wheel axle 40 and the presser flange 211.

Now, the configuration in the surroundings of the pinion gear will be described below.

The pinion shaft 166 with the circlip 185 and the O-ring 186 fitted thereon is inserted into an inner peripheral part (symbol 164 in FIG. 5) of the pinion gear 117. Then, the bearing part 123 (needle bearing) in the state of being fitted with the stopper ring 188 is fitted into the gear case 175. Next, a pinion gear assembly 223 with the pinion shaft 166 inserted is inserted into the gear case 175 from the front side in the condition where a first shim ring 224 and the bearing part 121 are sequentially fitted in this order onto the outer periphery of the tubular part 163 extending from the pinion shaft 166, the bearing part 121 is held by the first lock nut 181 and the second lock nut 182. Thereafter, the first oil seal 183 is fitted in position, and a first retainer clip 184 is attached.

Figure 8:
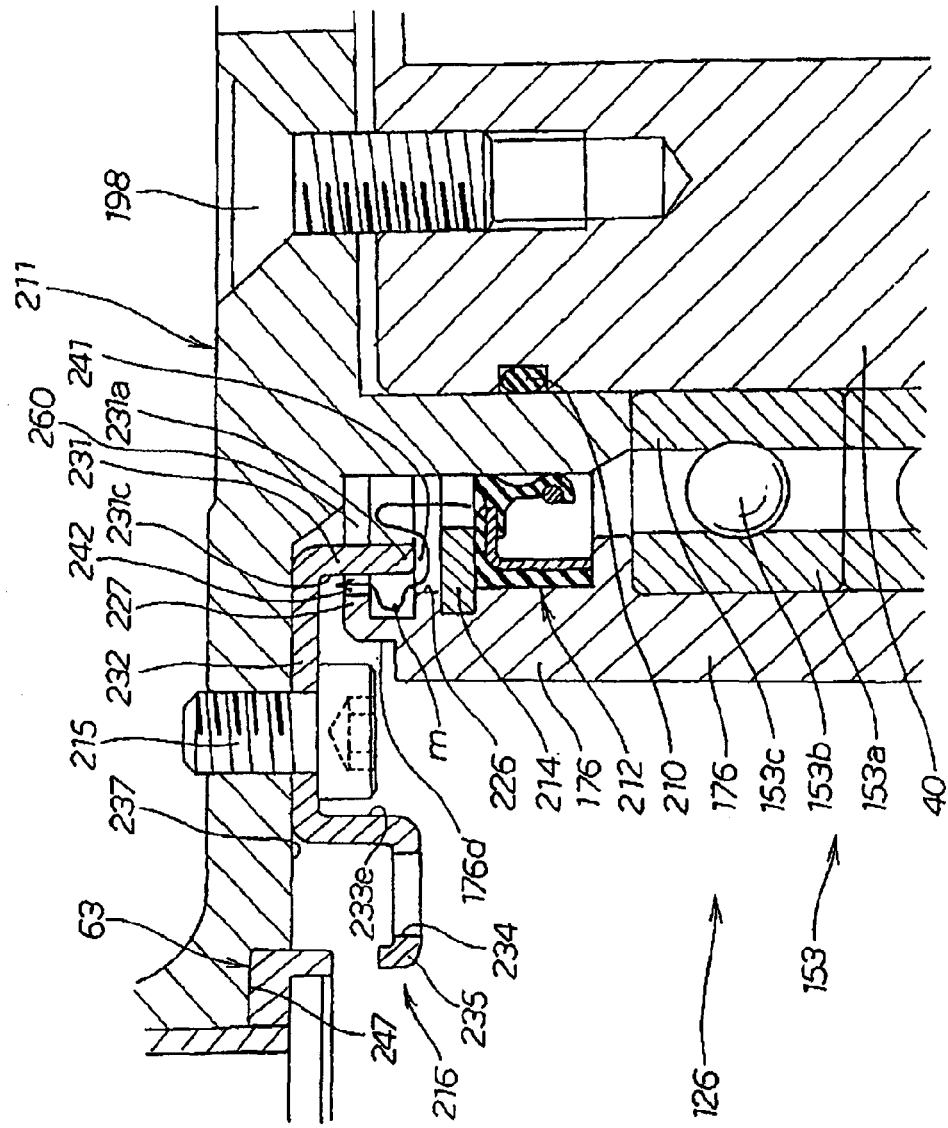
FIG. 8 illustrates a labyrinth structure provided in the gear box according to an embodiment of the present invention and operation of the same.

FIG. 8 illustrates a labyrinth structure provided in the gear box according to an embodiment of the present invention and operation of the same.

The gear case cover 176 as a component member of the gear box 124 is provided with an opening 226 in its outer end part, and an inside wall 227 extending toward the axis center of the rear wheel axle 40 is provided at the opening 226.

Since the inside wall 227 extending toward the center of the rear wheel axle 40 is provided at a rear wheel side end part of the opening part 226, a labyrinth can further be provided at a rear wheel side end part of the gear box 124. Therefore, leakage of oil through a gap between the gear box 124 and the rear wheel axle 40 can be further suppressed.

The pulser ring 216 playing the role of a component member of the labyrinth structure and serving as a member to be detected in measurement of wheel speed is a doughnut-shaped member. The pulser ring 216 includes, in the order from the inner side toward the outer side, an inner riser wall part 231 provided in parallel to the axial direction of the pulse ring 216 (in the axial direction of the rear wheel axle), a seat part 232 which extends outwards from the inner riser wall part 231 and perpendicularly to the axial direction of the pulser ring 216 and to which a bolt 215 is to be attached, an outer riser wall part 233 which extends toward the vehicle inner side from the seat part 232 and in parallel to the axial direction of the pulser ring 216, and a detected part 235 which extends outwards from the outer riser wall part 233 and perpendicularly to the axial direction of the pulser ring 216 and which is formed with a multiplicity of small holes 234 for detection of wheel speed. The inner riser wall part 231 and the outer riser wall part 233 are disposed opposite to each other.

The pulser ring 216 is attached to a ring mounting part 237 provided at an inside surface of the presser flange 211, through bolts 215.

Now, the labyrinth structure provided on the outer side of the axle oil seal 212 will be described below.

A first labyrinth passage 241 is formed between the retainer ring 214 for retaining the axle oil seal 212 and a tip part 231a of the inner riser wall part 231 provided as part of the pulser ring 216, and, on the outer side of the first labyrinth passage 241, a second labyrinth passage 242 is formed between the outside surface 231c of the inner riser wall part 231 and an inner wall 227 provided as part of the gear case cover 176.

Specifically, the inner riser wall part 231 as a labyrinth wall part extending in the vehicle width direction is integrally provided in the radial direction of the pulser ring 216, and the inner riser wall part 231 is disposed close to the retainer ring 214 and the inner wall 227, whereby the labyrinth structure is formed.

With the labyrinth structure thus provided, the route in the case of leakage of oil from the axle oil seal 212 is as indicated by arrow (m), so that oil leakage from the bearing 153 can be delayed.

Operation of the shaft drive type motorcycle as above-described will be described below.

FIG. 9 illustrates the mounting structure for the pulser ring according to an embodiment of the present invention and a comparative example. The inside of the gear box 124 is filled up with lubricating oil, the axle oil seal 212 is provided between the gear box 124 and the rear wheel axle 40, and the labyrinth structure for enhancing a sealing effect is provided on the outer side of the axle oil seal 212.

In FIG. 9A, an Example is shown. The presser flange 211 provided with the hollow cylindrical part 219 extending inwards in parallel to the axis of the rear wheel axle and with the flange part 218 extending outwards perpendicularly to the axis of the rear wheel axle is fitted in the sleeve 151 provided as the rear wheel axle 40, and is attached to the sleeve 151 through the screw members 198. The seat part 232 of the pulser ring 216 is attached to the ring mounting part 237 serving as a component element of the flange part 218 through the bolt 215. The rear brake disc 63 is attached to the disc mounting parts 247 serving as component elements of the flange through the flat bolts 217.

The rear wheel axle 40 is provided with the pulser ring 216 for measurement of the wheel speed of the rear wheel 31, and the inner riser wall part 231 and the outer riser wall part 233 as labyrinth wall parts extending in the vehicle width direction are integrally provided on the radially inner side of the pulser ring 216.

In FIG. 9B, a Comparative Example is shown. A rear brake disc 63B is co-fastened to an outside surface 151Bc of a sleeve 151B serving as a rear wheel axle 40B by a fastening bolt 154B for fastening a rear wheel hub 31Bh. A labyrinth plate 252 is attached to the rear brake disc 63B through first bolts 253. A pulser ring 216B is attached on the outer side of the labyrinth plate 252 through second bolts 254. In other words, for forming a labyrinth structure, an exclusive-use labyrinth plate 252 is mounted separately from the pulser ring 216B.

In such a structure, the labyrinth plate 252 as a labyrinth member and the first bolts 253 for attaching the labyrinth plate 252 and the like are needed as separate members, so that the number of component parts is increased, which may lead to a rise in the cost of the vehicle.

Returning to (a) of FIG. 9, the pulser ring 216 is integrally provided with the inner and outer riser wall parts 231 and 233 as labyrinth wall parts, so that it is possible to suppress an increase in the number of component parts and to reduce the cost of the vehicle.

Now, operation of the presser flange will be described below.

Referring to FIGS. 5 to 7 also, the presser flange 211 is provided between the rear wheel axle 40 and the rear wheel 31. The presser flange 211 is provided with the flange part 218 for attaching the rear brake disc 63 serving as a brake disc, so that it is unnecessary to extend the rear brake disc 63 to the rear wheel axle 40.

Where the need to extend the rear brake disc 63 is eliminated, the rear brake disc 63 can be reduced in weight. In this case, since the presser flange 211 is provided with the plurality of arm parts 256 in an extending manner, an increase in weight due to the presser flange 211 can be suppressed, the amount of unnecessary material can be reduced and, as a whole, a reduction in the weight of the vehicle can be achieved. Further, with the presser flange 211 replaced by a member less expensive than the rear brake disc 63, the cost of the vehicle can be lowered.

In addition, the presser flange 211 has the hollow cylindrical part 219 for pressing the inner race 153c in the axial direction of the rear wheel axle 40. On the outer side of the right bearing 153, the rear wheel axle 40 is enlarged in the shaft diameter thereof due to the hollow cylindrical part 219 of the presser flange 211, so that rigidity of the rear wheel axle 40 can be easily secured.

Figure 10A:
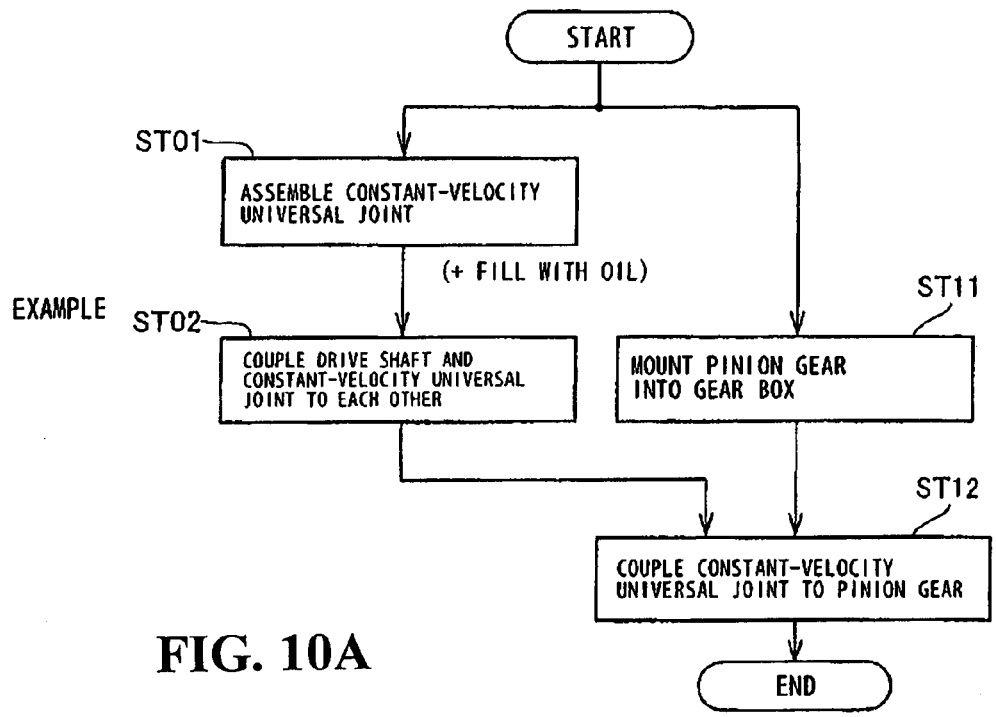
FIGS. 10A and 10B show flow charts for illustrating the procedure of assembling a drive shaft according to an embodiment of the present invention and a similar chart for a Comparative Example.

FIG. 10 shows a flow chart for illustrating the procedure of assembling the drive shaft according to an embodiment of the present invention and a similar chart for a Comparative Example, which will be described based on FIGS. 4 to 7.

In (a) of FIG. 10, an Example is shown. In step ST01, the constant-velocity universal joint 115 having the input shaft 156, the cup 157, the boot 158 and the like as component members is assembled, and the cup 157 is filled with oil. In step ST02, the input shaft 156 of the constant-velocity universal joint 115 is coupled to the drive shaft 112 serving as a component member of the drive shaft 32. Steps ST01 and ST02 can be carried out on a sub-assembly line or the like, whereby workability in assembly of the constant-velocity universal joint 115 can be enhanced.

In step ST11, the pinion gear 117 is mounted into the gear box 124 on a main line or the like. In step ST12, the constant-velocity universal joint 115 is coupled to the pinion gear 117, thereby completing the work.

Figure 10B:
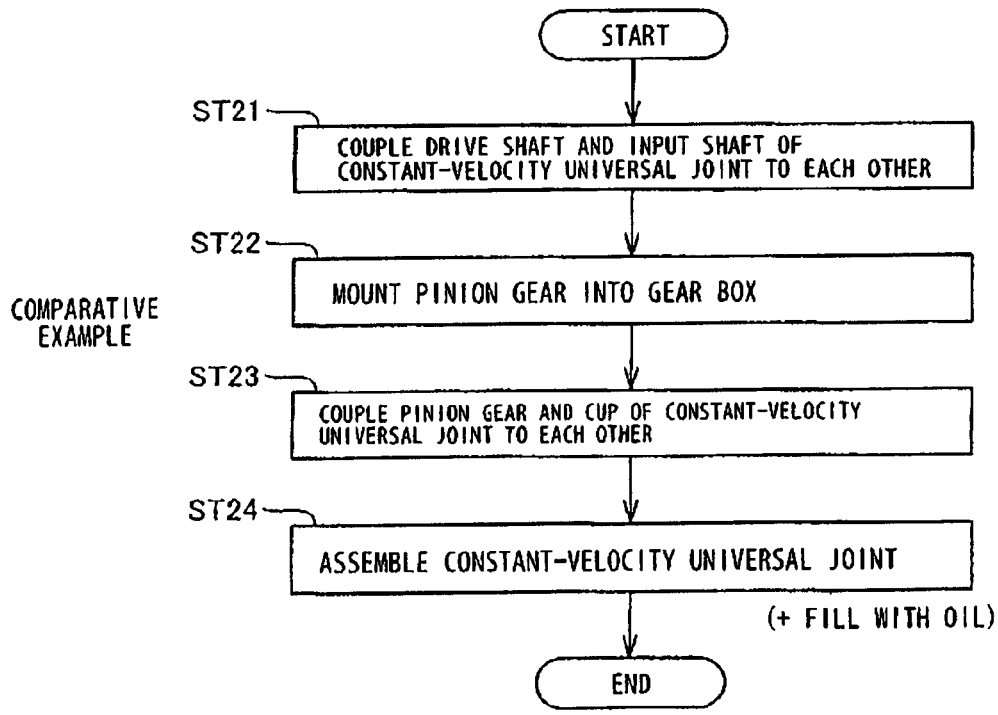

In FIG. 10(b), a Comparative Example is shown. In step ST21, a drive shaft and an input shaft of a constant-velocity universal joint are coupled to each other on a main line or the like. In step ST22, a pinion gear is mounted into a gear box. In step ST23, the pinion gear and a cup of the constant-velocity universal joint are coupled to each other. In step ST24, the constant-velocity universal joint is assembled, and the cup is filled with oil, thereby completing the assembly work.

In a constant-velocity universal joint having such a structure, sub-assembly of the constant-velocity universal joint prior to assembly of the drive shaft cannot be performed, and, therefore, the degree of freedom in assembling the drive shaft is limited. Besides, there has been room for improvements from the viewpoint of enhancing the speed and efficiency of the assembly work. For instance, in the Comparative Example, the assembly of the constant-velocity universal joint is carried out on the main line in a narrow, limited space. This has been a problem in view of productivity.

In this point, according to the present invention, the shaft part 171 is extended from the cup 157 of the constant-velocity universal joint 115, and the tubular part 163 of the pinion gear 117 is fitted to the shaft part 171. This ensures that the cup 157 of the constant-velocity universal joint 115 can be attached to the pinion gear 117 after sub-assembly of the constant-velocity universal joint 115. Therefore, it is possible to enhance the degree of freedom in the working procedure, and to achieve enhancement of the speed and efficiency of the work.

Further, since the constant-velocity universal joint 115 being large in size and weight is disposed close to the bearing part 121 of the pinion gear 117, generation of vibrations can be suppressed.

Now, description will be made of the structure in which the rear brake disc 63 attached to the presser flange 211 according to an embodiment of the present invention is provided so that it can be attached and detached.

In FIG. 9, the size relationship of a gap G between the presser flange 211 and the pulser ring 216 with the plate thickness T of the rear brake disc 63 is so set that T<G.

Such a configuration ensures that when the flat bolts 217 are removed, the rear brake disc 63 can be detached from the vehicle body by a process in which the rear brake disc 63 is floated to the left wide in the vehicle width direction (to the lower side in the figure) from the disc mounting parts 247 provided as part of the presser flange 211, and the rear brake disc 63 is turned in the direction of the arrow in FIG. 6 to the imaginary-line position.

Referring to FIGS. 4 and 6 also, the procedure of detaching the rear brake disc will be described below. First, the fastening bolts 154 are removed, the rear wheel 31 is detached to the right side in the vehicle width direction, and the rear disc brake caliper 62 is removed.

Next, the flat bolts 217 are removed, the rear brake disc 63 is detached from the presser flange 211, floated from the disc mounting parts 247, and moved to the left side in the vehicle width direction. Finally, the rear brake disc 63 is staggered from the arm parts 256 of the presser flange 211 with regard to the phase, and the fastening parts of the rear brake disc 63 are turned to such a position that the fastening parts of the rear brake disc 63 and the arm parts 256 of the presser flange 211 do not overlap with each other, whereby the rear brake disc 63 can be detached to the right side in the vehicle width direction.

Incidentally, while the present invention has been applied to a motorcycle in the above-described embodiment, the invention may be applied to general saddle ride type vehicles.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A shaft drive type motorcycle, comprising:
a body frame,
a swing arm provided on said body frame and operative to swingably support a rear wheel,
a drive shaft provided in said swing arm or adjacently to said swing arm and operative to transmit a driving force of an engine to said rear wheel, a constant-velocity universal joint interposed in said drive shaft, and
a pinion gear provided at one end of said drive shaft and meshed with a final gear provided at said rear wheel,
wherein a shaft part is extended from a cup of said constant-velocity universal joint,
said shaft part is provided with a male spline,
a tubular part is extended from said pinion gear, said tubular part being provided with a female spline in which to fit said male spline,
said male spline and a female spline constitute a spline coupling part, and
wherein said pinion gear is comprised of a tooth part, and a tubular part extending forward from said tooth part, said tubular part having a through-hole, a front half of said through-hole having with said female spline, and a pinion shaft is inserted in a rear half of said through-hole.

2. The shaft drive type motorcycle according to claim 1, wherein said spline coupling part is disposed on the inner side of a bearing part for supporting said tubular part of said pinion gear.

3. The shaft drive type motorcycle according to claim 2, wherein said pinion gear is comprised of a tooth part, and a tubular part extending forward from said tooth part, said tubular part having a through-hole, a front half of said through-hole having said female spline, and a pinion shaft is inserted in a rear half of said through-hole.

* * * * *